W. HEINE.
SPRINKLING APPARATUS.
APPLICATION FILED NOV. 28, 1919.

1,419,925.

Patented June 20, 1922.
2 SHEETS—SHEET 1.

Inventor
William Heine
By Braun Boettcher & Denner
Attorneys.

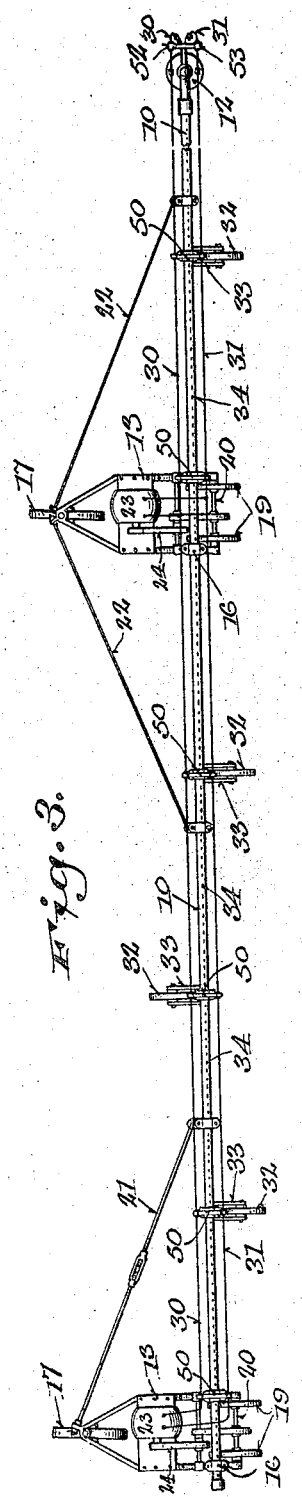

UNITED STATES PATENT OFFICE.

WILLIAM HEINE, OF MILWAUKEE, WISCONSIN.

SPRINKLING APPARATUS.

1,419,925.  Specification of Letters Patent.  Patented June 20, 1922.

Application filed November 28, 1919. Serial No. 341,203.

*To all whom it may concern:*

Be it known that I, WILLIAM HEINE, a citizen of Germany, residing at Milwaukee, in the county of Milwaukee and State of Wisconsin, have invented a certain new and useful Improvement in Sprinkling Apparatus, of which the following is a full, clear, concise, and exact description, reference being had to the accompanying drawings, forming a part of this specification.

This invention relates to sprinkling apparatus for distributing water or liquid fertilizer and the like over tracts of land under cultivation.

Devices have heretofore been designed for this purpose. A common type of such apparatus includes an elongated distributor communicating with and movable about a central distributing point which in turn is in communication with a source of water under pressure. The distributor is usually provided with a series of nozzles or other spraying devices throughout its length so that during its travel a circular area of land of considerable extent is supplied with water as desired. One or more carriages or tractors are usually employed for supporting and advancing the distributor over its circular course. As heretofore constructed these carriages have been large and cumbersome and have either been drawn by horses or driven by individually controlled internal combustion engines. Thus the productive area of the land is reduced due to the wide path required for each of the carriages. Furthermore such an arrangement requires the attention of one operator for each carriage in addition to the individual attention required for controlling the supply of water to the apparatus.

The general aim of the present invention is to improve and simplify the construction and operation of sprinkling apparatus of the character mentioned.

More specifically one object is the provision of improved means for advancing and controlling the movable distributor so that the operation of the entire apparatus may require the attention of only one operator.

Another object of the invention is the provision of means for delivering liquid fertilizer in the desired condition to the distributing apparatus.

Other objects and advantages will hereinafter appear.

One embodiment of the invention is illustrated in the accompanying drawings, in which:—

Figure 3 is a plan view of the distributor illustrated in Figure 2.

Figure 4 is a transverse section taken on the line 4—4 of Figure 2 and showing one of the carriages on a somewhat larger scale.

Figure 5 is a detail view illustrating the connection between the movable distributor and associated parts and the liquid supply main.

Figure 1:
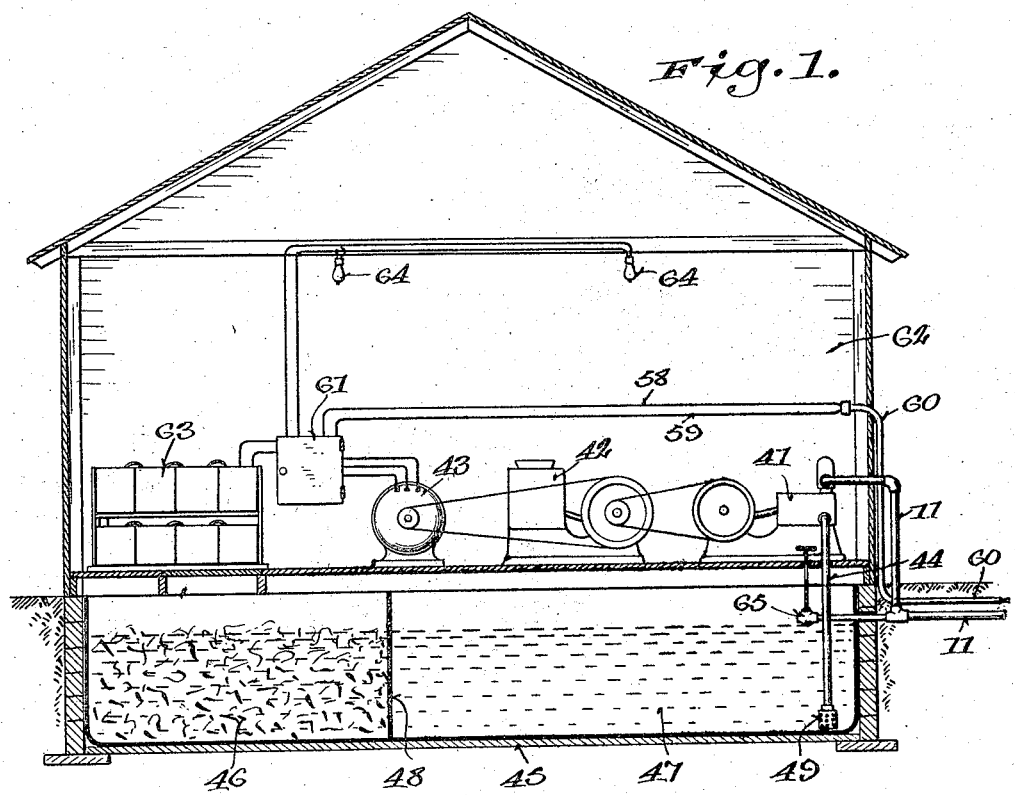
Figure 1 is a vertical section through a small power house diagrammatically illustrating the power apparatus employed in the embodiment of the invention hereinafter described.
Figure 2:
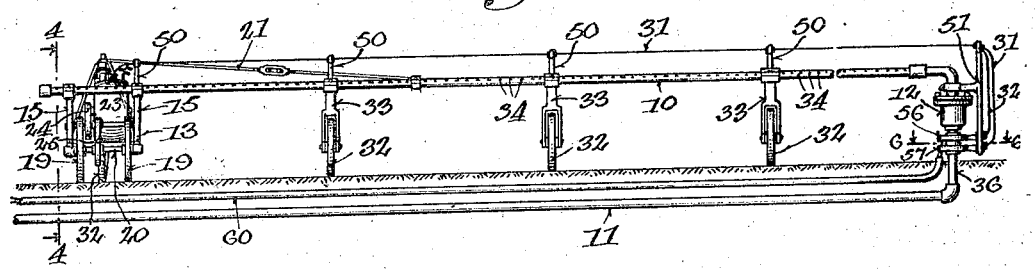
Figure 2 is a side elevation of a form of movable distributor employed and illustrating its connection with the source of liquid supply.
Figure 6:
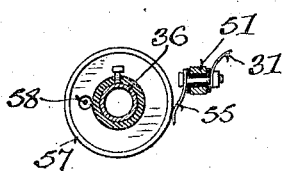
Figure 6 is a horizontal section taken substantially on the line 6—6 of Figure 5.

The apparatus hereinafter described includes primarily a movable distributor preferably in the form of a pipe 10 of considerable length communicating with a supply main 11 through a swivel connection 12 of any appropriate water tight construction. The pipe 10 is supported and caused to travel about the central connection 12 by means of one or more wheeled supports preferably in the form of small carriages 13.

The carriages may assume various forms. In the present instance each includes an open frame or chassis 14 carrying a rigid bracket 15 fixed to the pipe 10 by any appropriate means such as a clamp 16. The forward end of the frame is preferably supported by a caster wheel 17 pivotally connected with the frame preferably by means of an upright fork 18 preferably bent slightly rearwardly as shown in Figure 4. The rear end of the frame is preferably supported by one or more tractor wheels 19, keyed or otherwise fixed to a drive shaft 20. The carriages are preferably rigidly connected with the pipe 10 by means of a tie rod 21 or wires 22.

Each carriage is driven by an electric motor 23 of any approved type carried by the frame and operatively connected with the drive shaft 20 through any suitable connections such as belts 24 and 25 and pulleys 26, 27, 28 and 29. When two or more carriages are employed with a single distributor, the motors and driving connections are such that the carriages are driven at different speeds, the speed of each carriage depending upon its distance from the central connection 12. Thus it will be seen that the pipe 10 is caused to swing about the connection 12 without affecting the normal straight condition of the pipe. The motors are electrically connected with any appropriate source of electric current through the leads 30 and 31 and a common switch mechanism as will be later explained.

Additional supporting wheels or rollers 32 may be arranged intermediate the carriages to prevent the pipe 10 from engaging the earth. These auxiliary rollers 32 are preferably mounted upon forked members 33 preferably bent as shown and arranged in staggered relation so as to maintain the equilibrium of the pipe. The slight flexibility of the pipe 10 takes care of irregularities in the surface over which the pipe travels.

Various means may be provided for delivering the desired liquid from the pipe 10 to the land over which it passes. In the present instance this means includes a series of perforations 34 formed in and extending throughout the length of the pipe. Those perforations near the connection 12 are preferably somewhat smaller than those near the free end of the pipe so as to obtain an even distribution of the liquid.

The connection 12 is preferably the form of a stuffing-box 35 mounted upon the upturned end 36 of the supply main 11. The down turned end 37 of pipe 10 is provided with a flange 38 within and bearing against the bottom of the stuffing-box. Any suitable packing material is held pressed against the flange 38 by means of a clamping collar 39 adjustably connected with the box 35 by any appropriate means such as screws 40.

When used merely as an irrigating apparatus the supply main 11 may be connected with any available source of water under pressure. In the event that such pressure is not available or that it is desired to distribute a liquid fertilizer or the like the supply main 11 may be connected with a pump 41 of any approved type, as indicated in Figure 1. The pump may be driven by an internal combustion engine 42 or any other appropriate means. The engine 42 may also be connected with an electric generator 43 for supplying the necessary power to the motors 23 on the carriages. The desired liquid is supplied to the pump 41 through a pipe 44 leading from a tank or container 45 of any appropriate construction. The tank is preferably divided into two compartments 46 and 47 by means of a screen 48. The compartment 46 is designed to receive the fertilizer in a dry form. When dissolved in the water the solution may percolate through the screen 48 into the compartment 47. A small straining chamber 49 is preferably provided at the end of pipe 44 to prevent undissolved particles from entering the pump.

The electrical connections between the generator 43 and the motors 23 will now be described. The leads 30 and 31 from the motors 23 are preferably supported by insulated brackets 50 mounted upon the pipe 10. A bracket 51 is preferably clamped to the downturned end 37 of pipe 10 as shown more particularly in Figure 5. This bracket is provided with a pair of insulated eyes 52 and 53 for receiving the leads 30 and 31, respectively, and a pair of brushes 54 and 55 bearing against contact rings 56 and 57, respectively, fixed to and insulated from the upturned end 36 of supply main 11. Leads 30 and 31 are electrically connected with the brushes 54 and 55 and the rings 56 and 57 are electrically connected with line wires 58 and 59. This construction permits a free swinging movement of the pipe 10 without destroying the electrical connections between leads 30 and 31 and line wires 58 and 59, respectively.

Line wires 58 and 59 are preferably threaded through a suitable conduit 60 and are connected with the generator 43 through a suitable switch mechanism (not shown) arranged within the box 61.

The pump 41, engine 42 and generator 43 are preferably enclosed within a suitable housing 62 of any desired construction. A storage battery 63, fed from the generator 43, may also be provided within the housing 62 to provide the necessary power for the lights 64.

A cock 65 may be provided for draining the entire apparatus when not in use.

Thus it will be seen that an effective sprinkling apparatus has been provided in which the movement of the distributor, and the supply of liquid thereto, are readily controlled at one convenient point. The entire apparatus therefor requires the attention of only one operator. When the engine 42 is started the liquid is drawn from the tank 45 and is forced from the pump 41 through the main 11 and connection 12 to the distributor pipe 10 and is thus delivered in small streams through the perforations 34 to the ground. At the same time the generator sets up an electric current through the line wires 58 and 59, rings 56 and 57, brushes 54 and 55, and the leads 30 and 31 to the motors 23. The motors 23 are thus excited and the carriages actuated to cause the pipe 10 to travel about the connection 12 in the manner previously described. To stop the carriages and hence the travel of the pipe 10 it is only necessary to open the switch in the box 61. Or to bring the entire apparatus to rest it is only necessary to stop the engine 42.

Numerous changes may be made in the embodiment of the invention hereinabove specifically described without departing from or sacrificing any of the advantages of the invention as defined in the following claims:

1. In a device of the class described, the combination of a radial distributing pipe capable of rotation about a central pivotal member, means for supplying a liquid to said pipe for discharge therefrom at various points along the length of said pipe, a plurality of carriages disposed at different points along the length of said distributing pipe for supporting and driving the said pipe, said carriages each traveling in a circular path and at different circumferential speeds in accordance with their different radial positions during the entire operating period of the device, an individual electric motor on each of said carriages for driving the same, a conductor extending along said pipe for supplying current to said electric motors, a single control means for controlling the current supplied to all of said electric motors, said electric motors automatically proportioning their effective torques to the traction resistances encountered by their carriages, whereby to maintain a definite ratio of differential speeds between said carriages for driving and retaining said distributing pipe in a substantially straight radial line.

2. In apparatus for irrigating tracts of land, the combination of a radial distributing pipe, a relatively stationary supply connection about which said distributing pipe is adapted to revolve, said supply connection supplying an irrigating liquid to said distributing pipe for distribution by the latter, a plurality of carriages disposed at different points along said distributing pipe for supporting and driving the same, said pipes having a certain degree of flexibility to permit relative rise and fall between said carriages in passing over uneven areas of ground, the circumferential speeds of said carriages varying in accordance with their radial positions along said distributing pipe, an individual electric motor for driving each of said carriages, an electrical conductor extending along said distributing pipe and connecting with all of said motors, a co-operating contact ring and brush at said supply connection for electrically connecting said conductor with a source of power, common control means for controlling the supply of current to all of said motors, said electric motors automatically proportioning their effective torques to the traction resistances encountered by their carriages whereby a substantially definite ratio of differential speeds is automatically maintained between said carriages.

3. In apparatus for irrigating tracts of land, the combination of a distributing pipe, a stationary supply connection about which said distributing pipe is adapted to revolve, a plurality of carriages spaced along said distributing pipe for supporting the same, said pipe having a certain degree of flexibility to permit relative rise and fall between said carriages in passing over uneven areas of ground, electric motors on said carriages for driving the same, said carriages being comparatively narrow and light to minimize the injury to crops on the land, a plurality of supporting wheels for said distributing pipe disposed intermediate said carriages, an electrical conductor extending along said distributing pipe and connecting with said electric motors, contact mechanism at said supply connection comprising a contact ring and brush connecting with said conductor, a source of electrical power, and electrical control mechanism connecting between said source of electrical power and contact mechanism.

4. In a sprinkling apparatus, the combination of a relatively stationary supply conduit, a distributing pipe swiveled to said supply conduit, a plurality of carriages spaced along the length of said distributing pipe for supporting and driving the same, electric motors on said carriages for driving said carriages, said carriages being relatively narrow and light to minimize loss to crops on the land, a plurality of relatively narrow supporting wheels interspersed along said distributing pipe between said carriages, a pair of electrical conductors extending along said distributing pipe and connecting with said electric motors, a pair of contact rings mounted concentric with said supply conduit, a pair of contact brushes moving with said distributing pipe for connecting said electrical conductors with said contact rings, a source of electrical current connecting with said contact rings, and a source of liquid under pressure connecting with said supply conduit.

5. In apparatus for irrigating tracts of land, the combination of a distributing pipe, a supply conduit about which said distributing pipe is adapted to revolve, a plurality of driving carriages spaced along said distributing pipe for supporting the same, a plurality of single supporting wheels disposed intermediate said carriages for supporting said pipe, said wheels being alternately offset laterally with respect to said distributing pipe for preventing tipping of said pipe on said wheels, said pipe having a certain degree of flexibility to permit relative rise and fall between said carriages and said wheels in passing over uneven areas of ground, electric motors on said carriages, and a single means for controlling the operation of all of said motors and the movement of said distributing pipe.

In witness whereof I hereunto subscribe my name this 24th day of November, 1919.

WILLIAM HEINE.